UNITED STATES PATENT OFFICE.

BRUNO RICHARD SEIFERT, OF RADEBEUL, GERMANY, ASSIGNOR TO THE CHEMISCHE FABRIK VON HEYDEN, GESELLSCHAFT MIT BESCHRÄNKTER HAFTUNG, OF SAME PLACE.

PROCESS OF MAKING ORTHOSULFAMIN-BENZOIC-ACID ALKYL ESTERS.

SPECIFICATION forming part of Letters Patent No. 604,503, dated May 24, 1898.

Application filed January 27, 1897. Serial No. 620,864. (No specimens.)

*To all whom it may concern:*

Be it known that I, BRUNO RICHARD SEIFERT, of Radebeul, near Dresden, in the Kingdom of Saxony, German Empire, have invented a certain new and useful Process for the Production of Orthosulfamin-Benzoic-Acid Alkyl Esters, of which the following is a specification.

The alkyl esters of orthosulfamin-benzoic acid have hitherto been produced by treating orthosulfamin-benzoic-acid salts with iodin alkyls or by decomposing anhydrosulfamin-benzoic acid. (*Berichte der Deutschen Chem. Gesellschaft* 20, 1601.) These processes are not, however, suitable for the manufacture, commercially, of orthosulfamin-benzoic-acid alkyl esters for the purpose of utilizing the latter for the production of anhydrosulfamin-benzoic acid.

The usual process for esterizing acids by treating an alcoholic solution of the respective acid with mineral acids has heretofore appeared impracticable for the production of orthosulfamin-benzoic-acid alkyl esters, it being known that in treating orthosulfamin-benzoic acid with mineral acids the amid group is very readily split off. Now I have found that notwithstanding this circumstance orthosulfamin-benzoic acid is readily esterized by treatment with alcohols and mineral acids under certain conditions, as hereinafter described. As a main condition for the success of the reaction and in order that the yield shall be an industrially appreciable one the smallest possible amounts of mineral acid and alcohols freed as far as possible from water should be used. If these precautions are not observed, the yield of ester is very considerably diminished on account of the partial decomposition of the orthosulfamin-benzoic acid to orthosulfo-benzoic acid.

A good yield of orthosulfamin-benzoic-acid ethyl ester is obtained as follows: To forty kilograms alcohol of ninety-eight per cent. there are added, with stirring, ten kilograms orthosulfamin-benzoic acid and two kilograms of concentrated sulfuric acid. The mixture is heated to the boiling-point for several hours, a return-flow condenser being used. The alcohol is thereafter distilled off and the residue poured into cold water, when the ester separates in the form of a quickly-setting oil. By crystallization from dilute alcohol the ester is obtained in the form of fine white needles having a melting-point of 83° to 84° centigrade. Instead of using sulfuric acid any other water-absorbing substances may be used—such, for example, as hydrochloric-acid gas, acid salts, like $SO_2\genfrac{}{}{0pt}{}{OH}{ONa}$.

Other alcohols than ethyl alcohol may also be used, if desired.

The process takes place after the following formula:

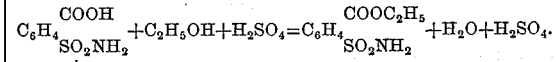

The orthosulfamin-benzoic acid required for this purpose may be manufactured by oxidizing crude or pure toluolsulfamid or by any other suitable process.

The orthosulfamin-benzoic-acid alkyl ester may be converted into anhydro-orthosulfamin-benzoic acid, as is well known, (*Berichte der Deutschen Chemischen Gesellschaft* 20, 1604,) by simply heating the ester alone or by dissolving it in an alkaline liquid.

What I claim as my invention is—

The process of manufacturing orthosulfamin-benzoic-acid alkyl esters which consists in converting orthosulfamin-benzoic acid into an alkyl ester by heating it in an alcoholic solution with a small quantity of a water-absorbing substance, substantially as described.

In testimony that I claim the foregoing as my invention I have signed my name in presence of two subscribing witnesses.

BRUNO RICHARD SEIFERT.

Witnesses:
HERNANDO DE SOTO,
PAUL ARRAS.